United States Patent [19]

Bernhardt

[11] Patent Number: 4,943,305
[45] Date of Patent: Jul. 24, 1990

[54] AERATING APPARATUS FOR EXPELLING VOLATILE IMPURITIES FROM GROUND WATER

[76] Inventor: Bruno Bernhardt, Goerdelerstr. 2 W 113, D-7410 Reutlingen 11-Betzingen, Fed. Rep. of Germany

[21] Appl. No.: 359,096

[22] Filed: May 26, 1989

[30] Foreign Application Priority Data

Jun. 23, 1988 [DE] Fed. Rep. of Germany ... 8808089[U]

[51] Int. Cl.⁵ .............................................. B01D 19/00
[52] U.S. Cl. ........................................ 55/170; 55/196; 202/201; 202/205; 210/220
[58] Field of Search ............... 202/201, 203, 205; 55/196, 170; 210/220; 261/122

[56] References Cited

U.S. PATENT DOCUMENTS

| | | | |
|---|---|---|---|
| 3,265,370 | 8/1966 | Scholten | 261/108 |
| 3,640,516 | 2/1972 | Willinger | 261/121.2 |
| 3,920,552 | 11/1975 | Elkern | 210/220 |
| 4,101,607 | 7/1978 | Bart | 261/121.2 |
| 4,166,086 | 8/1979 | Wright | 261/121.2 |
| 4,274,959 | 6/1981 | Roediger | 210/220 |
| 4,478,765 | 10/1984 | Tubbs | 210/170 |
| 4,505,813 | 3/1985 | Graves | 210/170 |
| 4,533,470 | 8/1985 | Gyulaváari | 210/195.3 |
| 4,608,163 | 8/1986 | Yohe et al. | 210/170 |
| 4,687,494 | 8/1987 | Escobal | 55/196 |
| 4,710,324 | 1/1987 | Vesnaver | 261/121.2 |
| 4,741,825 | 5/1988 | Schiller | 210/170 |
| 4,749,497 | 6/1988 | Kanzleiter et al. | 210/170 |

FOREIGN PATENT DOCUMENTS 3625488 10/1987 Fed. Rep. of Germany .

Primary Examiner—Virginia Manoharan
Attorney, Agent, or Firm—Michael J. Striker

[57] ABSTRACT

An aerating apparatus or aerator for expelling the impurities from ground water, especially for ground water under an overpressure, in which the impurities are expelled by generating a partial vacuum in an aeration shaft in the vicinity of ground water to be purified and by feeding fresh air below the water level in the aeration shaft, the aeration shaft is closed on its upper end with a pressurized receiving chamber. The pressurized receiving chamber permits fresh air to be brought in at an air pressure balancing the ground water pressure. Moreover a vacuum generator producing the partial vacuum is located in the pressurized receiving chamber.

3 Claims, 1 Drawing Sheet

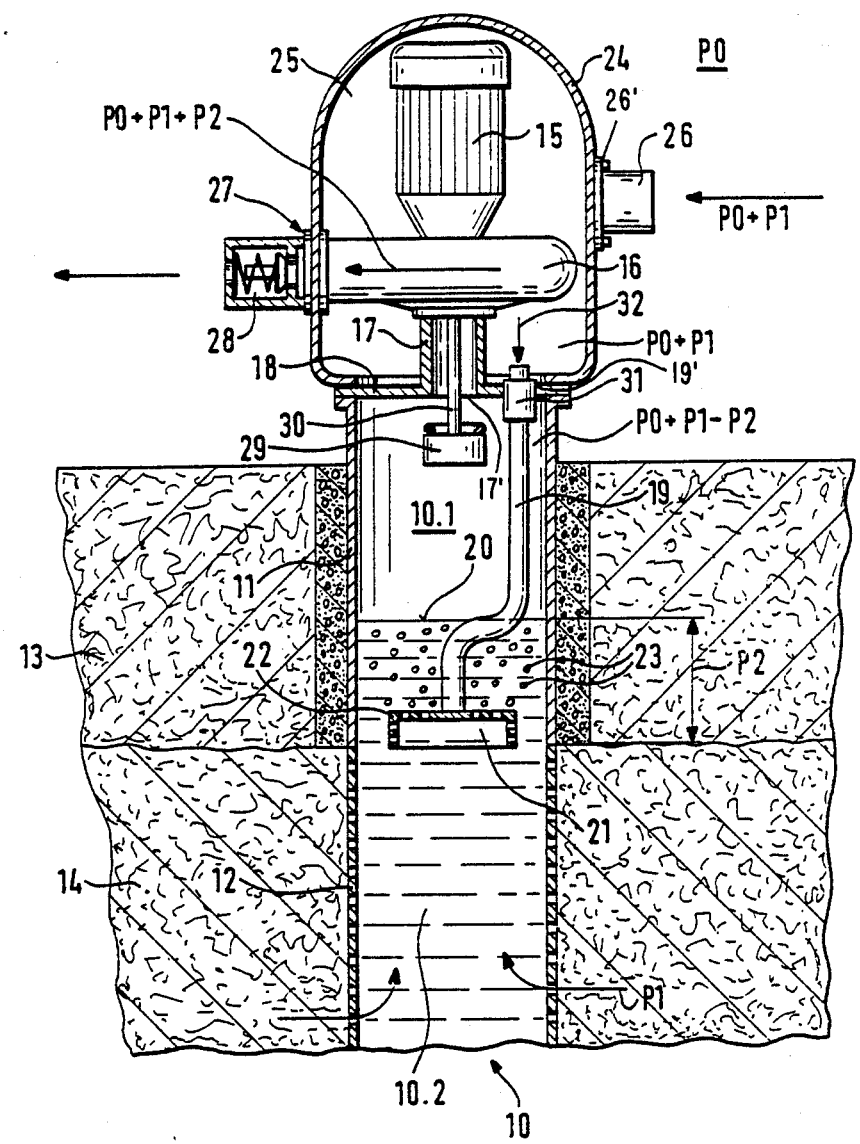

AERATING APPARATUS FOR EXPELLING VOLATILE IMPURITIES FROM GROUND WATER

BACKGROUND OF THE INVENTION

My invention relates to an aerating apparatus or fountain for removing or expelling volatile impurities from ground water, especially pressurized ground water.

An aerating apparatus for expelling volatile impurities from ground water and earth through which the ground water flows is known in which the impurities are expelled by generating a partial vacuum in an aeration shaft in the vicinity of the ground water to be purified and by feeding fresh air below the water level in an aeration shaft.

Apparatus of the above-described type has already been described(e.g. in German Open Patent Application No. 36 25 488 of the applicant). In contrast to the conventional process, in which pressurized air is pressed into the earth surrounding the aeration shaft and/or into the ground water collecting in the aeration shaft with considerable energy consumption, in this design air alone is conducted with a partial vacuum formed in the water-free portion of the aeration shaft. It has been shown that with comparatively little vacuum surprisingly large quantities of volatile impurities in the gaseous state can be drawn off and a considerably larger efficiency can be attained than in the above-mentioned conventional process. In the conventional process laminar flows are ruptured by the high pressure employed and vortexes form, which considerably reduce the efficiency of the plant.

The performance of the preceding process is difficult in cases in which pressurized ground water or ground water at a ground water pressure corresponding to an overpressure must be treated. This case can occur especially when mineral water, which frequently stands under an overpressure, must be purified by the aeration shaft.

SUMMARY OF THE INVENTION

Accordingly, it is an object of my invention to provide an improved aerating apparatus or aerator which can also operate satisfactorily with pressurized ground water.

In keeping with this object and with others which will become apparent hereinafter, the aeration shaft is closed on its upper end with a pressurized receiving chamber, which is fed fresh air at a pressure balancing the ground water overpressure and in which the vacuum pump unit producing the partial vacuum in the aeration shaft is located.

By the pressurized receiving chamber, which can be formed by a sealing container mounted on the aeration shaft opening, the aeration shaft is closed to the exterior so that a water-free head region of the aeration shaft can be provided by fresh air fed at a balancing pressure. In this head region the vacuum which is crucial for the purification relative to the pressure existing in the aeration shaft, which is above atmospheric, can be provided. When an air receiving space is advantageously provided below the water level of the ground water along with feed means for guiding air to the air receiving space which is separated from the fluid containing portion of the aeration shaft by a screen wall, the air receiving space can be combined by an air duct with the pressurized receiving chamber, in which fresh air is fed at a fresh air balancing pressure. Volatile impurities are expelled with air through a second exhaust opening which penetrates the wall of the pressurized receiving chamber.

So that no pressurized ground water can be forced into the pressurized receiving chamber when the apparatus is stopped, a float valve can appropriately be located in the air duct leading to the air receiving space and/or in an air intake pipe located upstream of the air intake of the vacuum generator. In restarting the apparatus a water-free region can be provided at the upper end of the aeration shaft with the help of pressurized air. The pressure is subsequently lowered to the balancing pressure before the vacuum generator is put into operation and a partial vacuum is produced in an upper aeration shaft portion relative to the balancing pressure.

BRIEF DESCRIPTION OF THE DRAWING

The objects, features and advantages of my invention will be made more apparent from the following detailed description, reference being made to the accompanying drawing in which:

The sole FIGURE is a cross sectional view through an aerating apparatus or aerator for expelling volatile impurities from ground water and/or the earth surrounding it according to my invention.

DETAILED DESCRIPTION OF THE INVENTION

The drawing shows an aeration shaft 10 equipped with an unperforated pipe 11 in its upper end region 10.1 and a screen or sieve pipe 12 in its lower water or fluid-containing region 10.2. The aeration shaft 10 extends through an upper ground layer 13 restraining or damming the ground water until in a lower ground layer 14 conducting the ground water. The ground water is pressurized and thus flows into the aeration shaft 10 under a pressure Pl, which is larger than the atmospheric pressure.

The arrangement for expelling volatile impurities from the ground water forced in the aeration shaft comprises a fan 16 driven by an electric motor 15 which makes a partial vacuum in the upper ground water-free aeration shaft region 10.1. An air intake pipe 17, which leads to an air intake connector opening 17, formed in a cover 18 closing the exterior opening of the aeration shaft 10, is located in front of or upstream of the fan 16. Also a duct connector opening 19' for an air duct 19 formed by a tube, which leads to an air receiving space 21 below the ground water level 20 in the aeration shaft 10, is provided in the cover 18. The air receiving space 21 is bounded upwardly and laterally by a wall screen 22, through whose openings the air can rise from the air receiving space 21 in the form of air bubbles 23 to the fluid level 20.

A container 24 is mounted on the cover 18 of the aeration shaft 10, in which the fan 16 with the drive motor 15 is located and which encloses a pressurized compartment 25. The container has a first fresh air opening 26' to the outside for a fresh air pipe 26 and a second exhaust opening 27 for exhaust of air from the fan 16 which acts as a source of low pressure. A pressure limiting valve 28 is located adjacent the second exhaust opening 27.

The volatile impurities expelled from the water in the aeration shaft 10 are forced through the fan 16 and out the second exhaust opening 27 with the accompanying air.

The fresh air opening for the air intake pipe 17 of the fan 16 formed in the cover 18 is closable by a float valve whose float 29 is mounted longitudinally slidable on a central guide rod 30. Also the air duct 19 is closable in the vicinity of the cover 18 by the float valve 31.

The pressure P1 due to the pressurized ground water exists in the deeper portion 10.2 of the aeration shaft 10. The suction pressure P2 of the fan 16, as indicated by the double arrow in the drawing, acts between the air receiving space 21 and the water level 20. A fresh air pipe 26 is provided in a first fresh air opening in the container 24. Fresh air is conducted through the fresh air pipe 26 with a pressure $P_o + P1$ into the pressurized receiving chamber 25. This pressure is of a size such that the ground water overpressure P1 is compensated by it. The fresh air arising under this balancing pressure is fed by the air duct 19 into the air receiving space 21 by action of the fan 16. A pressure $P_o + P1 - P2$ forms in the ground water-free aeration shaft region 10.1 under the vacuum action of the fan 16. The pressure on the outlet side of the fan 16 amounts to $P_o + P1 + P2$.

With the help of the pressurized receiving chamber 25 the vacuum arrangement may also operate with the desired satisfactory purifying action of our invention. If the fan is switched off and the fresh air feed interrupted, the fluid level can rise in the aeration shaft 10. The float valves 29, 31 can prevent water from being forced into the region of the container 24. After making a ground water-free upper shaft region 10.1 by temporary conduction of pressurized air into this region each time the initial conditions shown in the drawing for operation of the arrangement may be provided.

It will be understood that each of the elements described above, or two or more together, may also find a useful application in other types of constructions differing from the types described above.

While the invention has been illustrated and described as embodied in an aerating apparatus for expelling volatile impurities from ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

What is claimed is:

1. An aerating apparatus for expelling volatile impurities from ground water standing under a ground water pressure and from ground through which said ground water flows comprising:

an aeration shaft in said ground;

a vacuum generator mounted above said aeration shaft to generate a partial vacuum in said aeration shaft in the vicinity of said ground water to be purified;

a container including a pressurized receiving chamber mounted on an upper end of said aeration shaft, said vacuum generator forming said partial vacuum being located in said pressure receiving chamber;

means for feeding fresh air into said ground water collected in said aeration shaft below a water level of said ground water in said aeration shaft, wherein said means for feeding said fresh air comprises an air receiving space bounded by a screen wall located in said ground water and an air duct connecting said air receiving space with said pressurized receiving chamber and a float valve in said air duct leading to said air receiving space;

said fresh air being conductible to said pressurized receiving chamber at a fresh air pressure balancing said ground water pressure so that said volatile impurities expelled from said ground water in said aeration shaft are forced through said vacuum generator and out a second exhaust opening with accompanying air.

2. Aerating apparatus according to claim 1, further comprising a cover for separating said pressurized receiving chamber from said aeration shaft and an air intake pipe for said vacuum generator, said cover being penetrated by said air intake pipe for said vacuum generator and by said air duct leading to said air receiving space.

3. Aerating apparatus according to claim 1, further comprising an air intake pipe for said vacuum generator and another float valve in said air intake pipe.

* * * * *